(12) United States Patent
Yin et al.

(10) Patent No.: US 11,525,271 B2
(45) Date of Patent: Dec. 13, 2022

(54) JIG AND METHOD FOR MAKING REINFORCEMENT CAGE

(71) Applicant: RUENTEX ENGINEERING & CONSTRUCTION CO., LTD., Taipei (TW)

(72) Inventors: Samuel Yin, Taipei (TW); Jui-Chen Wang, Taipei (TW); Shao Kuo Lu, Taipei (TW)

(73) Assignee: RUENTEX ENGINEERING & CONSTRUCTION CO., LTD., Taipei (TW)

( * ) Notice: Subject to any disclaimer, the term of this patent is extended or adjusted under 35 U.S.C. 154(b) by 0 days.

(21) Appl. No.: 17/716,199

(22) Filed: Apr. 8, 2022

(65) Prior Publication Data

US 2022/0228385 A1  Jul. 21, 2022

Related U.S. Application Data

(62) Division of application No. 16/196,100, filed on Nov. 20, 2018, now Pat. No. 11,326,360.

(30) Foreign Application Priority Data

Jul. 18, 2018  (TW) .................................. 107124760

(51) Int. Cl.
*E04G 21/12* (2006.01)
*B25B 11/02* (2006.01)
(Continued)

(52) U.S. Cl.
CPC .......... *E04G 21/122* (2013.01); *B21F 27/125* (2013.01); *B23Q 3/186* (2013.01);
(Continued)

(58) Field of Classification Search
CPC ....... B25B 11/00; B25B 11/02; E04C 5/0622; E04C 5/0604; E04C 5/06; E04C 5/04;
(Continued)

(56) References Cited

U.S. PATENT DOCUMENTS

| 2,884,967 A | 5/1959 | Le Vay |
| 6,560,834 B1 * | 5/2003 | Wirth ...................... B21F 27/20 29/33 F |

(Continued)

FOREIGN PATENT DOCUMENTS

| CN | 102672081 A | 9/2012 |
| CN | 203936514 U | 11/2014 |

(Continued)

OTHER PUBLICATIONS

Search report by Taiwan Intellectual Property Office dated Apr. 23, 2019, in corresponding Taiwan patent application 107124760, 1 page in English.

(Continued)

*Primary Examiner* — Lee D Wilson
*Assistant Examiner* — Robert F Neibaur
(74) *Attorney, Agent, or Firm* — Juan Carlos A. Marquez; Marquez IP Law Office, PLLC (57) ABSTRACT

The present disclosure relates to a jig for manufacturing a reinforcement cage, which comprises a base member, a plurality of rollers disposed on the base member and spaced at intervals, a trolley which is movable on the base member; a driving device for driving the trolley; and a member for positioning the main reinforcement disposed at the first end of the base member.

7 Claims, 12 Drawing Sheets

(51) Int. Cl.
  *B21F 27/12* (2006.01)
  *E04C 5/06* (2006.01)
  *B23Q 7/00* (2006.01)
  *B23Q 3/18* (2006.01)
  *B23Q 7/05* (2006.01)
  *B23Q 37/00* (2006.01)

(52) U.S. Cl.
  CPC ............... *B23Q 7/001* (2013.01); *B23Q 7/05* (2013.01); *B25B 11/02* (2013.01); *E04C 5/0622* (2013.01); *B23Q 7/055* (2013.01); *B23Q 37/005* (2013.01); *B23Q 2240/007* (2013.01)

(58) Field of Classification Search
  CPC .. E04G 21/122; B65G 35/066; B65G 35/063; B65G 35/06; B65G 35/00; B65G 13/00; B21F 27/20; B21F 31/00; B23Q 1/40; Y10T 29/53961
  USPC ...... 269/289 R, 291, 900, 46, 37, 43, 281.1, 269/281.5; 52/649.2, 664, 667, 576
  See application file for complete search history.

(56) References Cited

U.S. PATENT DOCUMENTS

| | | | |
|---|---|---|---|
| 8,336,701 B2 | 12/2012 | Ruggeber et al. | |
| 10,583,991 B2 | 3/2020 | Akiyama | |
| 10,626,612 B2 | 4/2020 | Yin et al. | |
| 2003/0071133 A1* | 4/2003 | Girouard, Sr. | B23B 39/167 238/109 |

FOREIGN PATENT DOCUMENTS

| | | |
|---|---|---|
| CN | 105880854 A | 8/2016 |
| CN | 106219181 A | 12/2016 |
| CN | 106694750 A | 5/2017 |
| CN | 207104179 U | 3/2018 |
| CN | 108284183 A | 7/2018 |
| CN | 207642463 U | 7/2018 |
| CN | 109332982 A | 2/2019 |
| EP | 0667195 | 8/1995 |
| JP | H04120372 A | 4/1992 |
| JP | H0999489 A | 4/1997 |

OTHER PUBLICATIONS

Taiwan Intellectual Property Office, First Office Action dated May 2, 2019, in corresponding Taiwan patent application 107124760, 11 pages in Chinese.
Chinese First Office Action and Search Report dated Dec. 24, 2020, in counterpart Chinese patent application 201810789353.2, 8 pages in Chinese, with English translation of Search Report, 2 pages.
Supplemental Search Report, Second Office Action dated Jul. 14, 2021, in counterpart Chinese patent application 201810789353.2, 6 pages in Chinese; 2 pages of the Supplemental Search Report in English translation.

* cited by examiner

JIG AND METHOD FOR MAKING REINFORCEMENT CAGE

FIELD OF THE INVENTION

The instant disclosure relates to a jig and a method for manufacturing a reinforcement cage

BACKGROUND

A reinforcement cage is typically used in a structure of reinforced concrete for resisting a tension force and/or for bearing a shear force externally applied to the structure. A conventional process of assembling a reinforcement cage requires temporarily holding the main bars in place at the scene before binding stirrups to the main bars to form the reinforcement cage. Equipment is required to calibrate levels of the bars and balance the bars to form the reinforcement cage. Such process is complicated and requires significant time, manpower and material resources. Thus, there is a need in the art to devise a manner of forming a reinforcement cage requiring less time, manpower and material resources.

SUMMARY OF INVENTION

The instant disclosure relates to a jig for manufacturing a reinforcement cage, which will shorten the time needed for making a reinforcement cage.

According to one exemplary embodiment of the instant disclosure, a jig for manufacturing a reinforcement cage comprises: a base member; a plurality of rollers disposed on the base member and spaced at intervals; a trolley movable on the base member by the rollers; a driving device for driving the trolley; and a main bar positioning member disposed at a first end of the base member.

According to another exemplary embodiment of the instant disclosure, a method for making a reinforcement cage comprises: providing a jig for manufacturing a reinforcement cage as described in the immediately preceding embodiment; arranging a trolley at a second end of the base member, which is opposite to the first end of the base member; providing at least one spiral stirrup on the trolley; providing at least one main bar, wherein one end of the at least one main bar is fixed in the slots of the main bar positioning member such that the at least one main bar extends along the lengthwise direction of the base member; and actuating the driving device to drive the trolley to move toward the first end of the base member along the lengthwise direction of the base member such that the at least one main bar relatively passes through a central space of the at least one spiral stirrup to thereby install the at least one main bar into the at least one spiral stirrup disposed on the trolley.

In order to further understand the instant disclosure, the following embodiments are provided along with illustrations to facilitate appreciation of the instant disclosure; however, the appended drawings are merely provided for reference and illustration, without any intention to limit the scope of the instant disclosure.

BRIEF DESCRIPTION OF THE DRAWINGS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

DETAILED DESCRIPTION

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiments disclosed herein.

Figure 1:
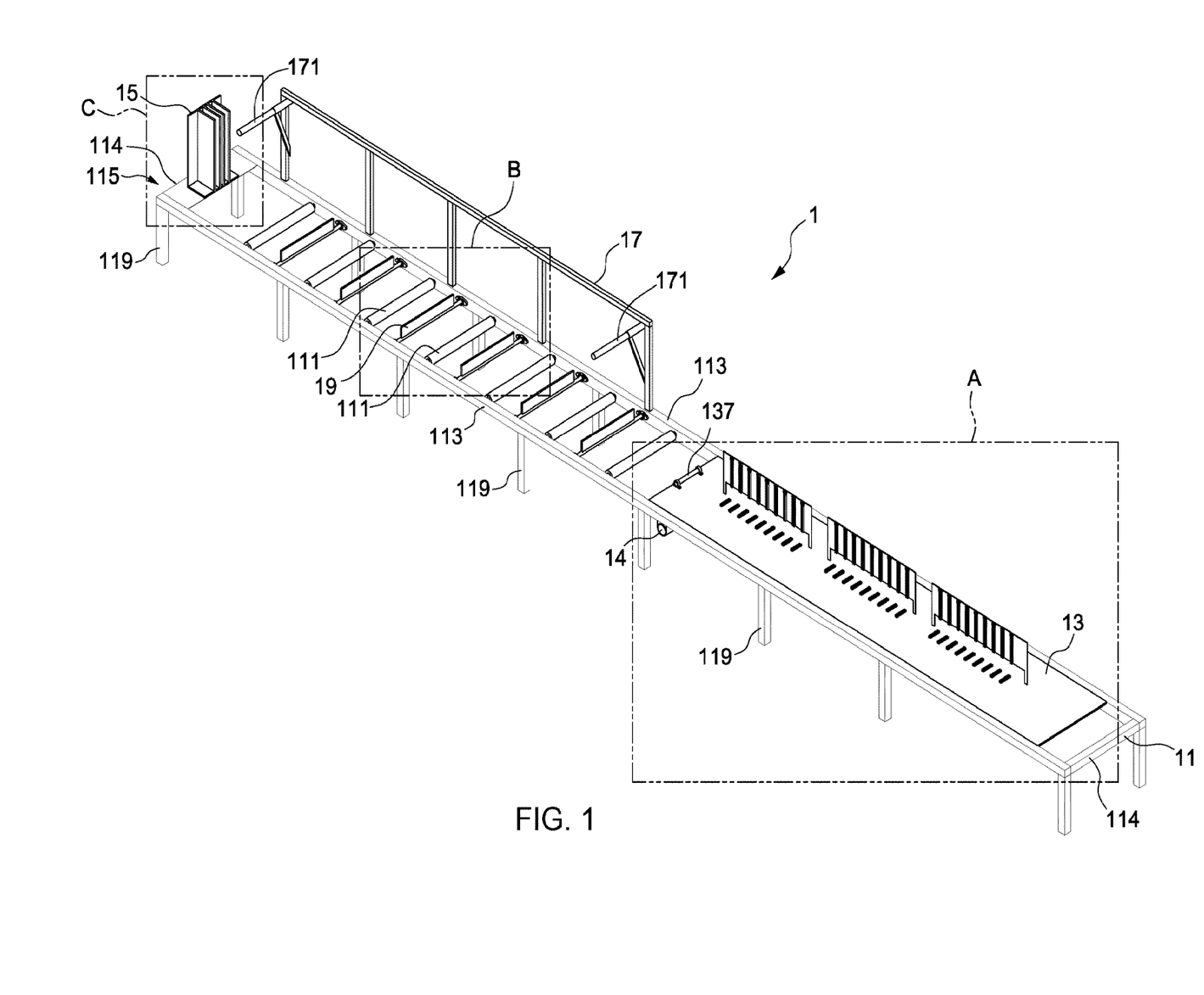
FIG. 1 is a perspective view of a jig for manufacturing a reinforcement cage in accordance with an embodiment of the instant disclosure.

FIG. 1 shows a jig 1 for manufacturing a reinforcement cage in accordance with an embodiment of the instant disclosure. The jig 1 has an elongated base member 11 and a plurality of legs 119 supporting the base member 11 that keep the base member at a distance from the ground. A plurality of rollers 111 are disposed on the base member 11 and spaced at intervals along a lengthwise direction of the base member 11. Specifically, the base member 11 is frame-shaped and has two long sides 113 and two short sides 114, wherein the rollers are pivotally arranged between two long sides 113. A trolley 13 used for carrying stirrups is slidably disposed on the rollers 111. A driving device 14 is provided to drive the trolley 13 to move along the lengthwise direction of the base member 11. Further, a main bar positioning member 115, which is used for fixing ends of the main bars, is disposed at the first end 115 of the base member 11, and an auxiliary frame 17 is disposed at a long side 113 of the base member 11 and is adjacent to the first end 115 of the base member 11, wherein a plurality of removable supporting rods 171 are disposed above the base member 11 and projects from a side of the auxiliary frame 17 in the manner of a cantilever.

Figure 2:
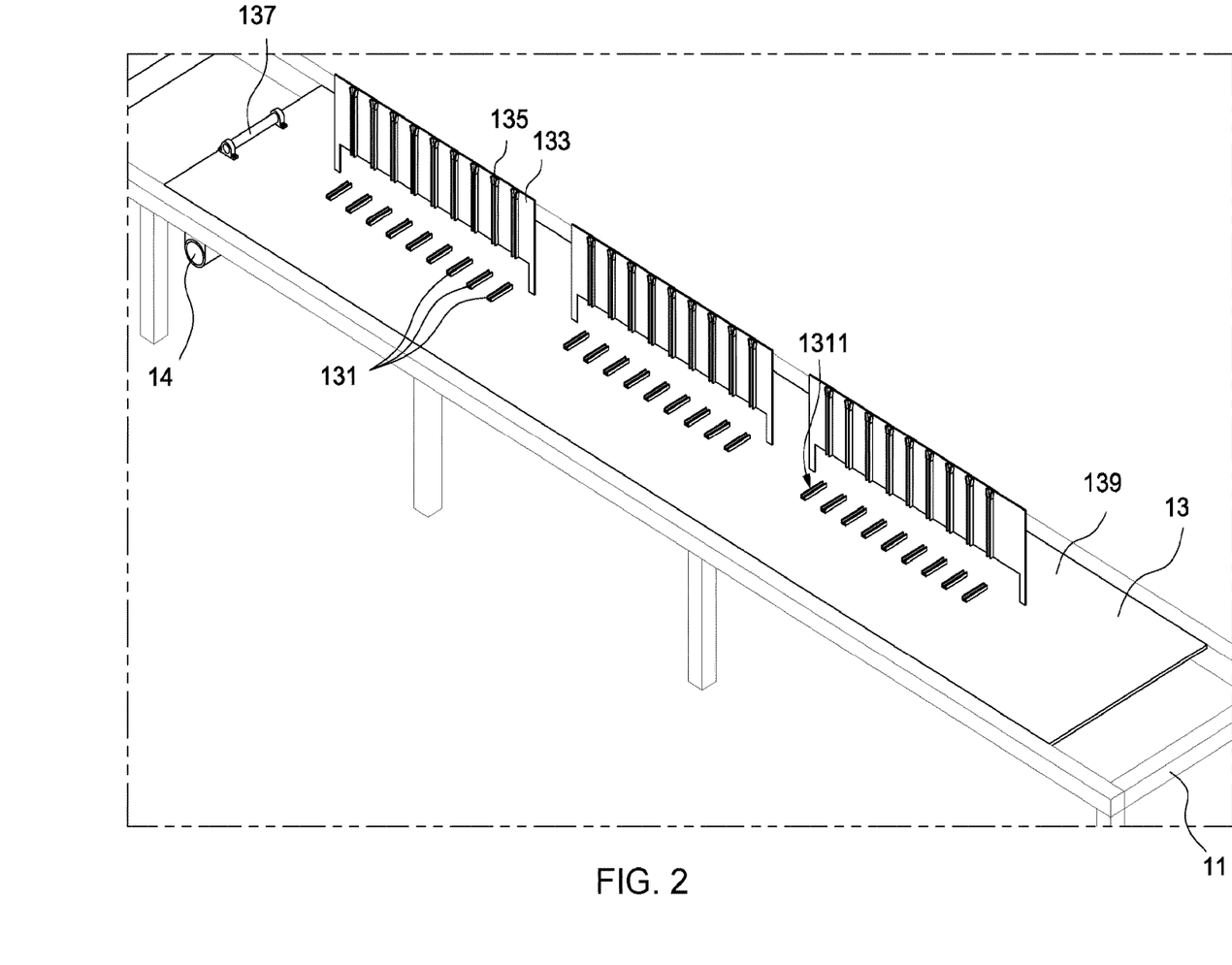
FIG. 2 is an enlarged view of portion "A" shown in FIG. 1.

FIG. 2 is an enlarged view of portion "A" shown in FIG. 1. As shown in FIG. 2, the trolley 13 has a bottom plate 139. A plurality of seats 131 are arranged on the bottom plate 139 of the trolley 13 and along a lengthwise direction of the trolley 13. These seats 131 are spaced at intervals and substantially parallel to each other in a direction transverse to the lengthwise direction of the trolley 13. Each seat 131 has a positioning groove 1311 therein. Moreover, a plurality of stirrup supports 133 are substantially disposed at one side of the seats 131, which are arranged in a row, and extend along a lengthwise direction of the trolley 13. Each of the stirrup supports 133 comprises a plurality of stirrup positioning members 135. The stirrup positioning members 135 are arranged so that they correspond to the seats 131 respectively. In detail, one stirrup positioning members 135 is configured to be substantially aligned with one seat 131. As shown in FIG. 5F, each of the stirrup positioning members 135 comprises a slot therein, wherein the slot has a Y-shaped entrance 1351 at its top end. Further, the side edges of the stirrup 21 could be installed into the slots of the stirrup positioning members 135 and fixed to the stirrup positioning members 135 through the Y-shaped entrances 1351.

In addition, the trolley 13 further comprises an auxiliary roller 137 disposed at one end of the trolley 13, which faces toward the first end 115 of the base member 11.

Figure 3:
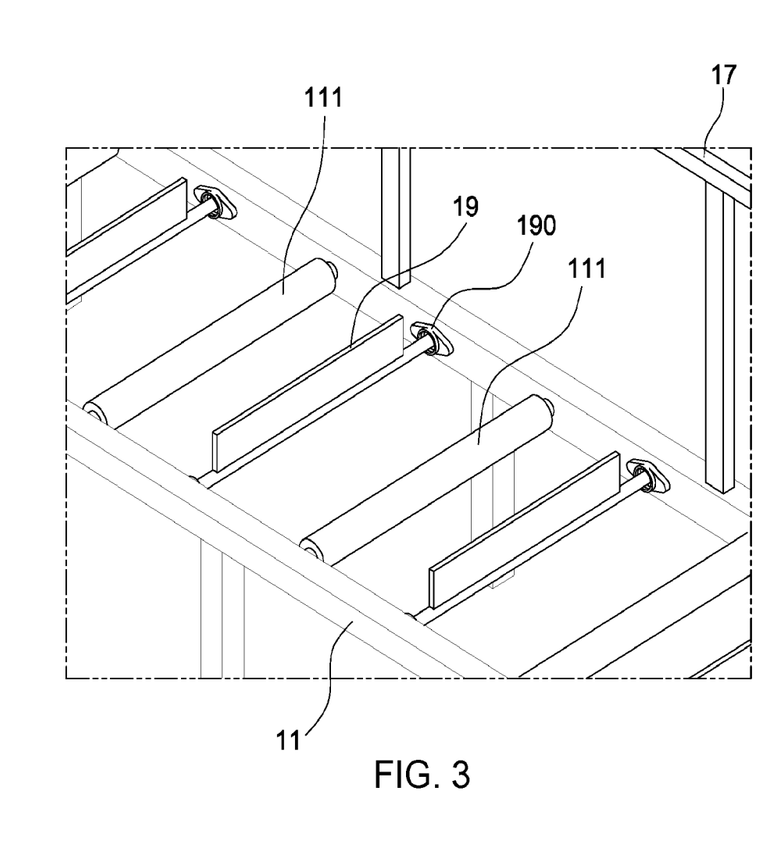
FIG. 3 is an enlarged view of portion "B" shown in FIG. 1.

FIG. 3 is an enlarged view of portion "B" shown in FIG. 1. In addition to the rollers 111, the base member 11 further comprises a plurality of main bar supports 19 spaced at intervals along a lengthwise direction of the base member 11. In particular, each main bar support 19 is arranged between two adjacent rollers 111. That is, the main bar supports 19 and the rollers 111 are arranged alternatively. As shown in FIG. 3, each main bar support 19 is rotatably mounted at the base member 11 through a pivoting member 190, and the pivoting member 190 comprises a spiral spring (not shown) which retains the main bar support 19 so that the top of the main bar support 19 extends beyond the top of the bottom plate 139 of the trolley 13 when the main bar support 19 is in its default position. On the other hand, when an external force is applied to the main bar support 19, the main bar support 19 will be rotated along the direction of the external force and against the torsion provided by the spiral spring of the pivoting member 190. When the external force is removed from the main bar support 19, the main bar support 190 will return to its default position through the restoration force provided by the spiral spring.

Figure 4:
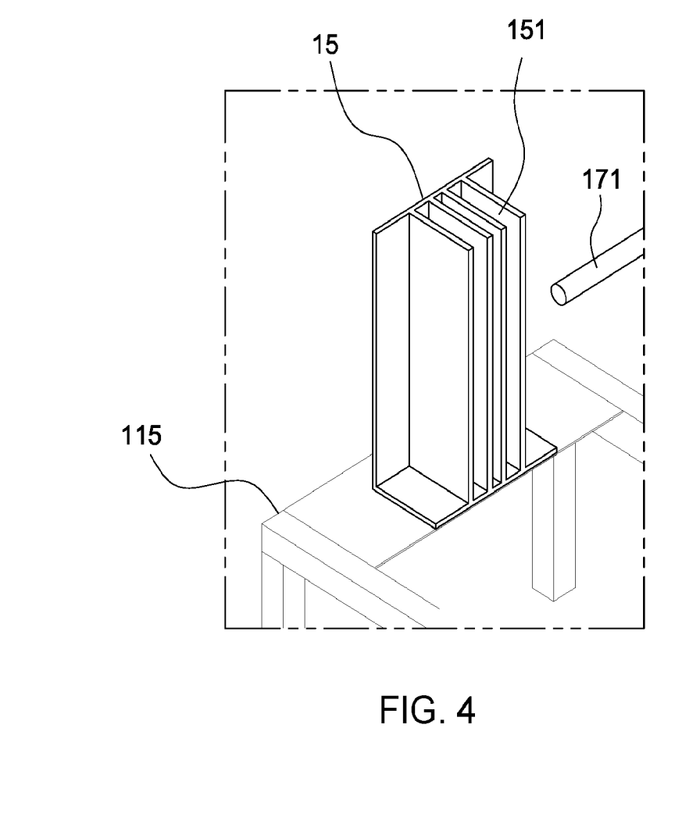
FIG. 4 is an enlarged view of portion "C" shown in FIG. 1.

FIG. 4 is an enlarged view of portion "C" shown in FIG. 1. As shown in FIG. 4, the main bar positioning member 15 comprises multiple slots 151. In this embodiment, the main bar positioning member 15 comprises two slots which are spaced apart from each other by a distance and are generally parallel to each other.

Figure 5A:
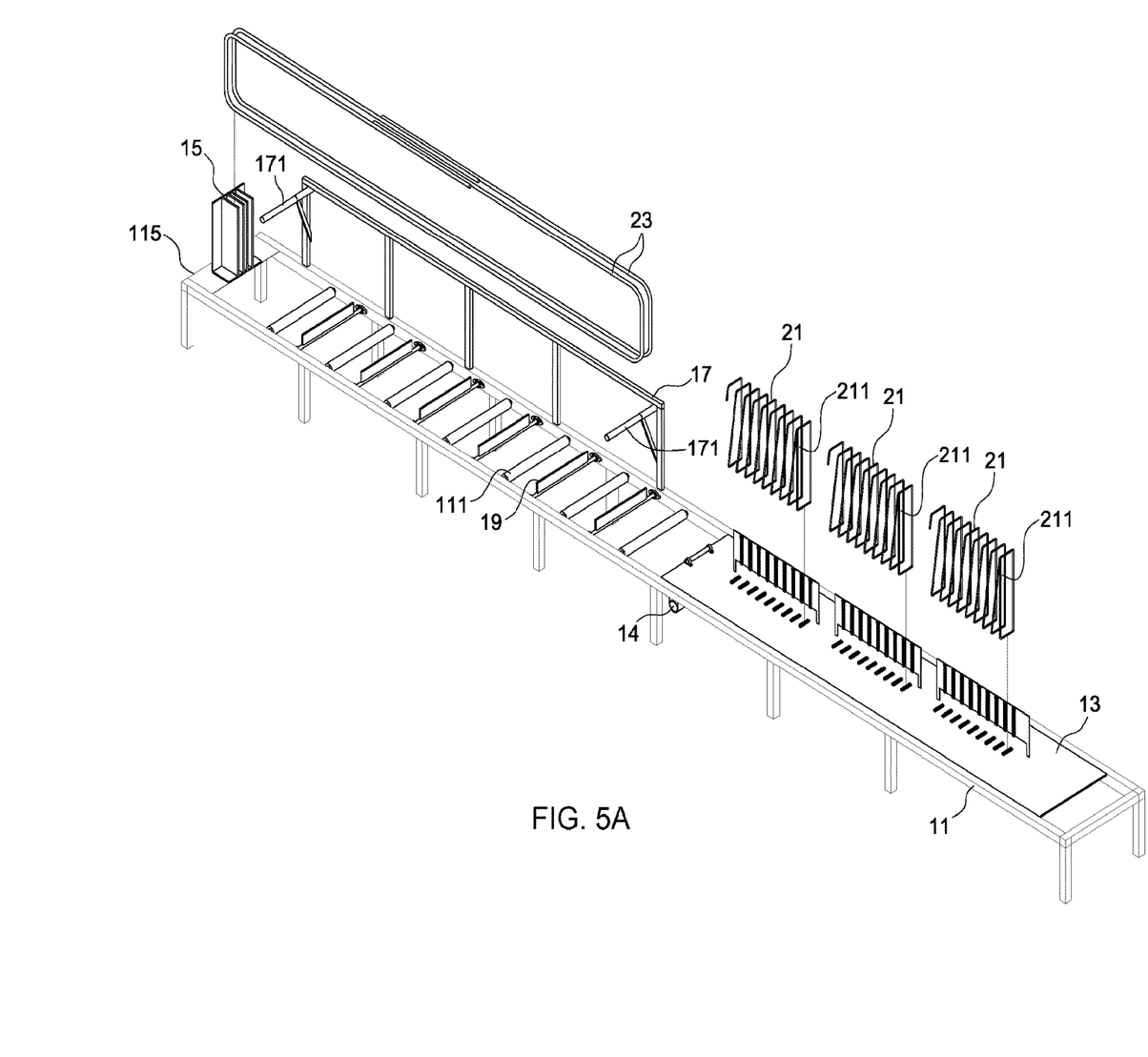
FIG. 5A is an exploded view showing a jig for assembling a reinforced cage in accordance with an embodiment of the instant disclosure.
Figure 5B:
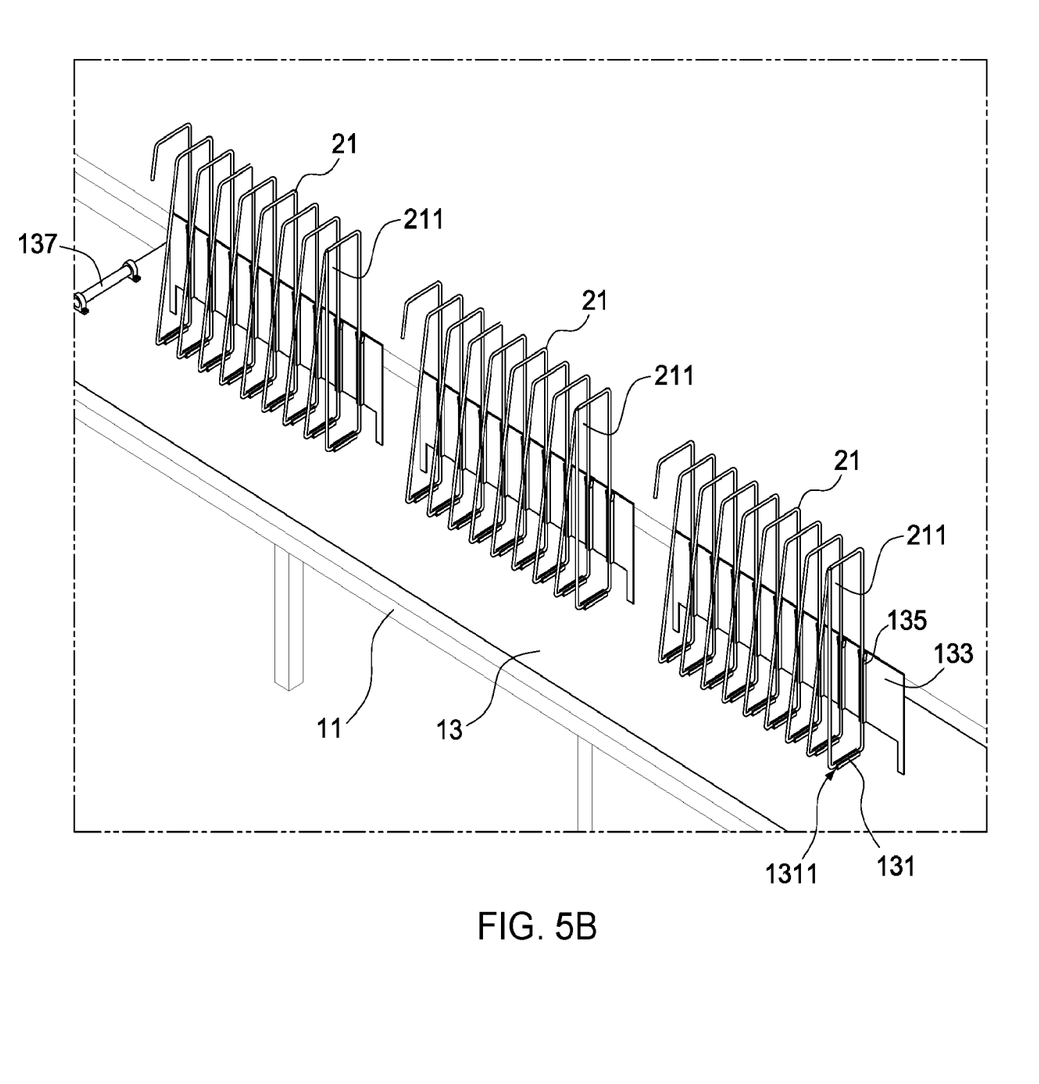
FIG. 5B is a schematic view showing the side edges of the spiral stirrups are fixed to the stirrup positioning members in accordance with an embodiment of the instant disclosure.
Figure 5C:
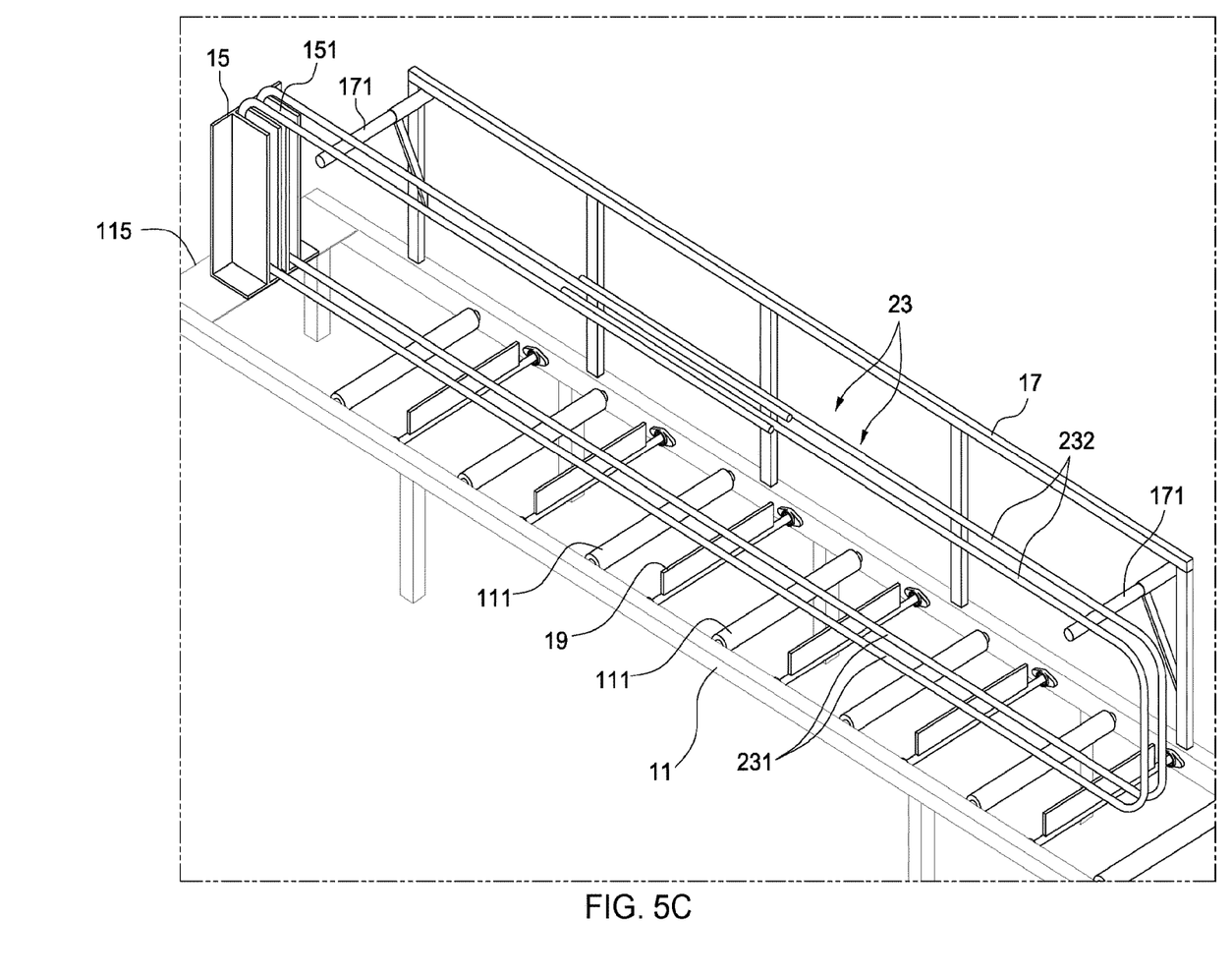
FIG. 5C is a schematic view showing the main bars are fixed to the main bar positioning member in accordance with an embodiment of the instant disclosure.
Figure 5D:
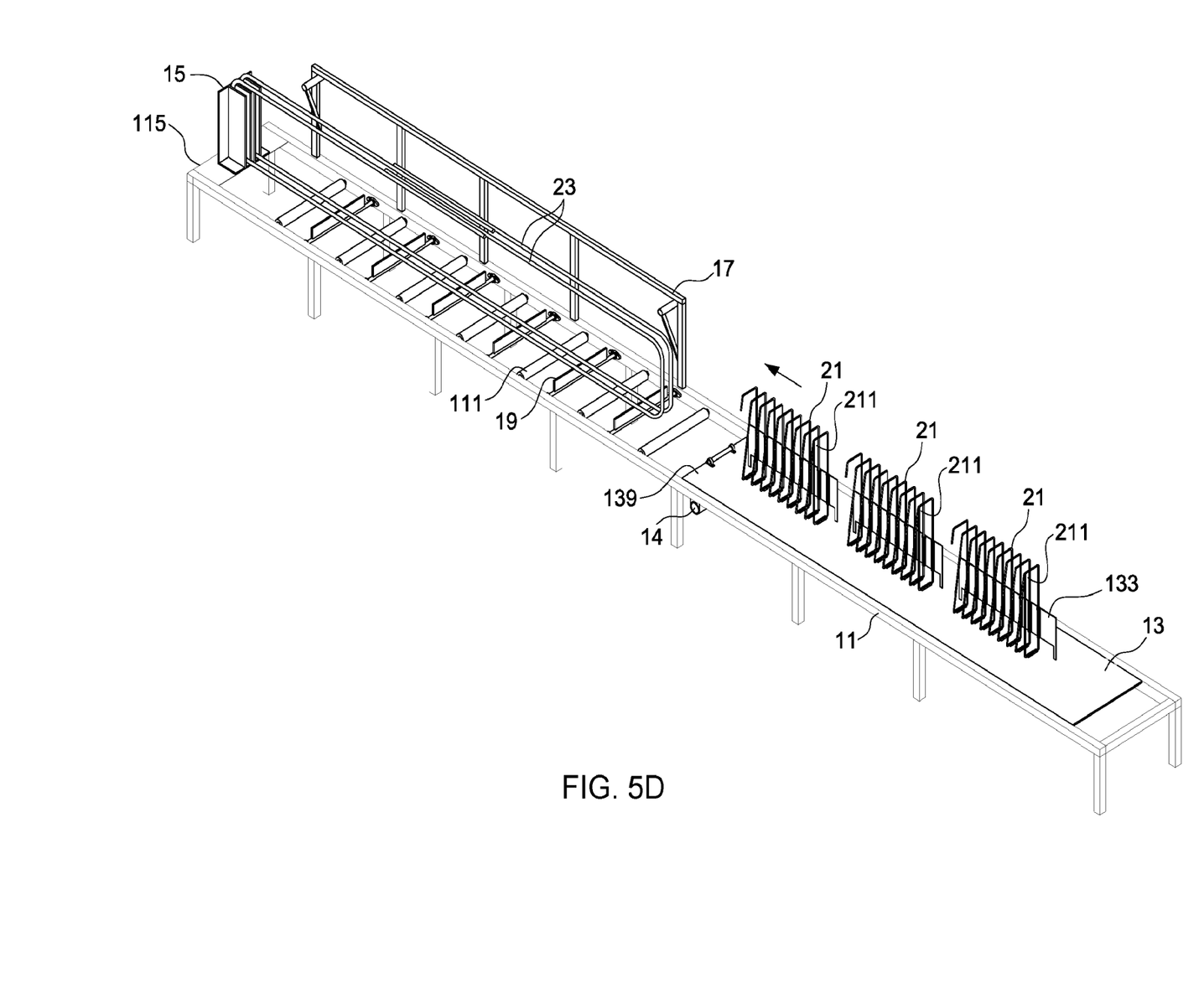
FIG. 5D is a schematic view showing the jig in accordance with an embodiment of the instant disclosure, in which the stirrups are to be installed onto the main bars.
Figure 5E:
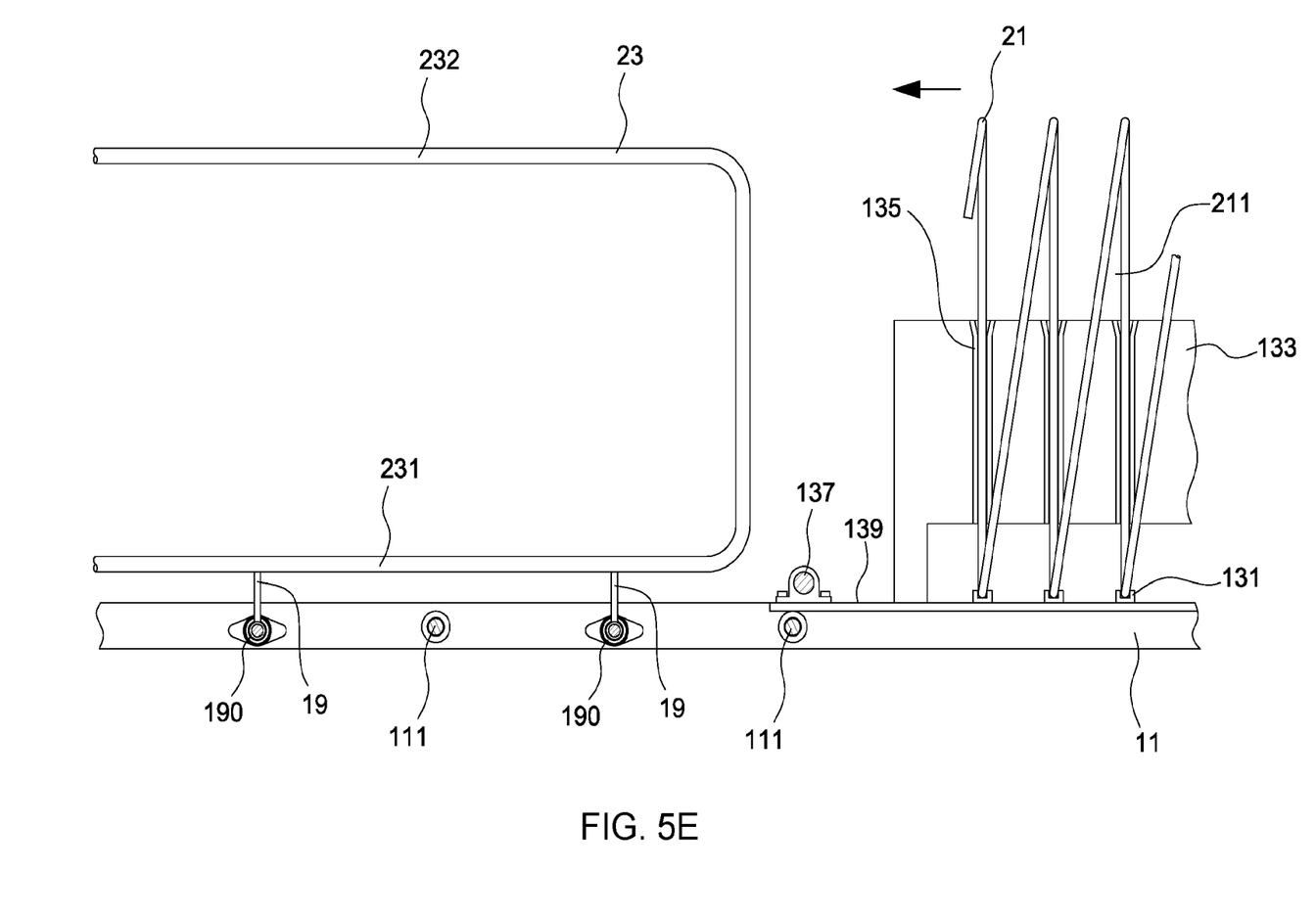
FIG. 5E is a regional view showing the stirrups are to be installed onto the main bars in accordance with an embodiment of the instant disclosure.
Figure 5F:
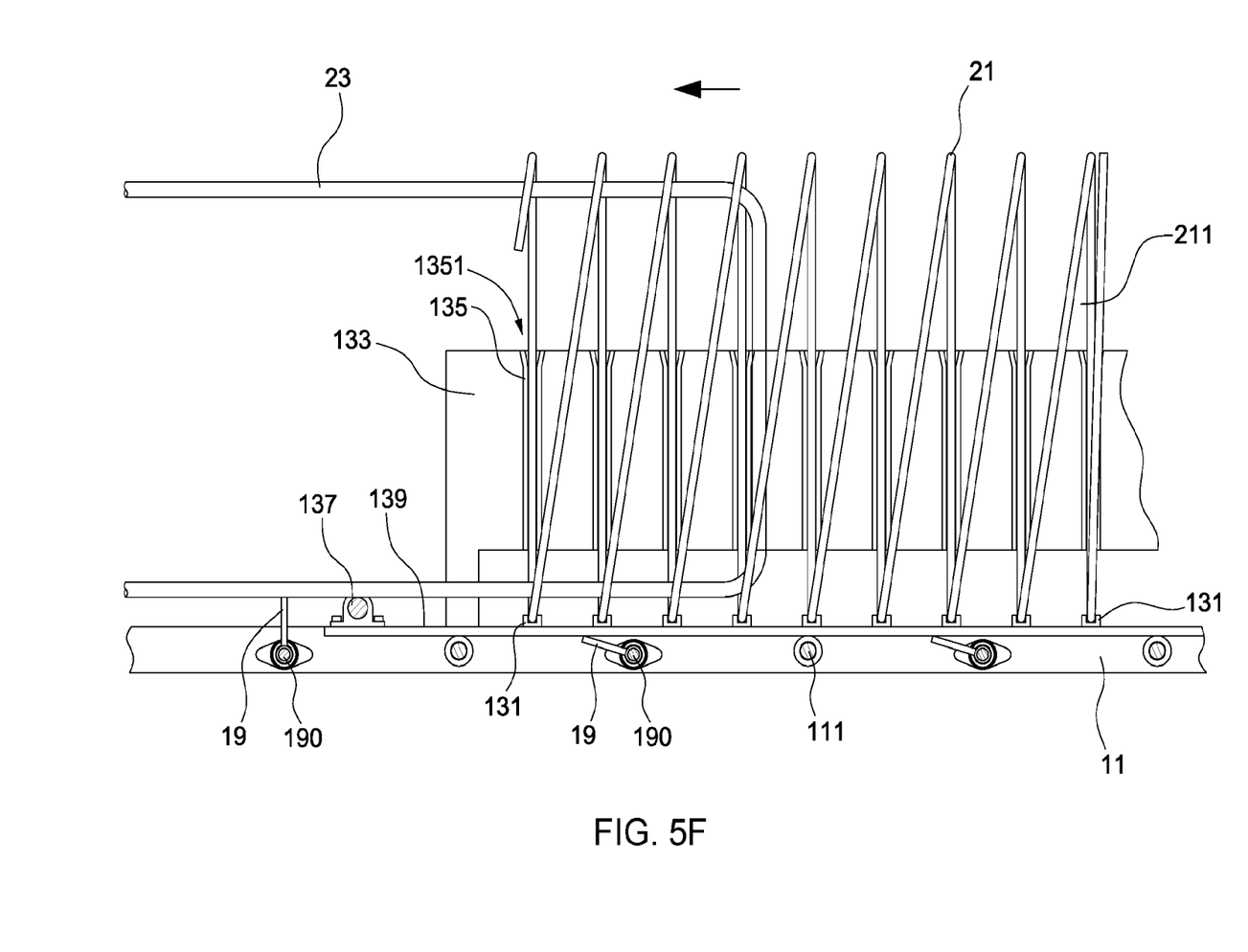
FIG. 5F is another regional view showing the stirrups are in the process of being installed onto the main bars in accordance with an embodiment of the instant disclosure.

FIGS. 5A-5I are schematic views showing the jig 1 for manufacturing a reinforcement cage in accordance with an embodiment of the instant disclosure. As shown in FIG. 5A, several spiral stirrups 21 are arranged on the trolley 13 and two elongated main bars 23 are fixed to the base member 11 of the jig 1 through the main bar positioning member 15. The trolley 13 is initially positioned at the second end of the base member 11, which is opposite to the first end 115 of the base member 11. Referring to FIG. 5B, three spiral stirrups 21 are arranged on the trolley 13. Each bottom edge of each spiral stirrup 21 is fixedly received in the groove 1311 of the seat 131, and each side edge of each spiral stirrup 21 is fixedly received in the stirrup positioning members 135 of the stirrup support 133. Thus, the spiral stirrups 21 are stably disposed on the trolley 13. Moreover, referring to FIG. 5C, two elongated main bars 23 are fixed to the jig through the main bar positioning member 115 wherein each of the main bars 23 is loop-shaped. One end of each elongated main bar 23 is received in the slot 151 of the main bar positioning member 15, and the supporting rods 171 of the auxiliary frame 17 extend through the elongated main bars 23 from their sides and support the underside of the top edges 232 of the elongated main bars 23.

After the elongated main bars 23 are fixed to the base member 11 of the jig 1 and the spiral stirrups 21 are fixed to the trolley 13, the driving device 14 could be actuated to move the trolley 13 along the lengthwise direction of the base member 11. Referring to FIG. 5D, the trolley 13 is driven by the driving device 14 and moves toward the first end 115 of the base member 11 and along the lengthwise direction of the base member 11. When the trolley 13 moves, the elongated main bars 23 fixed to the base member 11 will be installed into the spiral stirrups 21 fixed to the trolley 13. That is, the elongated main bars 23 will relatively pass through a central space 211 of the spiral stirrups 21. In addition, before driving the trolley 13 to move forward or backward on base member 11, the supporting rods 171 should be removed from the auxiliary frame 17, and the elongated main bars 23 fixed to the base member 11 could be smoothly installed into the spiral stirrups 21 fixed to the trolley 13.

FIGS. 5E and 5F show that the trolley 13 moves forward and the elongated main bars 23 are in the process of being installed into the spiral stirrups 21. FIG. 5E shows that the trolley 13 moves toward an end of the elongated main bars 23 and in the meantime the elongated main bars 23 have not yet been installed into the spiral stirrups 21. As shown in FIG. 5E, the elongated main bars 23 are fixed to the jig 1, the bottom edges 231 of the elongated main bars 23 are supported by the main bar supports 19 and the trolley 13 is driven to move on the rollers 111 and toward an end of the elongated main bars 23. Before the base member 11 contacts the main bar supports 19, there is no force applied to the main bar supports 19, and the tops of the main bar supports 19 extend beyond the tops of the base plates 139 of the trolley 13. FIG. 5F shows that the trolley 13 contacts the main bar supports 19 and the elongated main bars 23 are in the process of being installed into the spiral stirrups 21. As shown in FIG. 5F, the front of the trolley 13 pushes the main bar supports 19, and the main bar supports 19 rotate counterclockwise and against the torsion provided by the torsion spring (not shown) in the pivoting member 190. Meanwhile, other main bar supports 19 which are not pushed by the trolley 13 are maintained to support the elongated main bars 23 such that the bottom edges 231 of the elongated main bars 23 are disposed above the bottom plate 139 of the trolley 13. Accordingly, the bottom plate 139 of the trolley 13 could pass underneath the bottom edges 231 of the elongated main bars 23 and the elongated main bars 23 will relatively pass through a central space 211 of the spiral stirrups 21. Thereby, the elongated main bars 23 can be installed into the spiral stirrups 21. Further, the auxiliary roller 137 disposed on the front of the trolley 13 helps the elongated main bars 23 to smoothly pass through the central space 211 of the spiral stirrups 21 during the movement of the trolley 13.

Figure 5G:
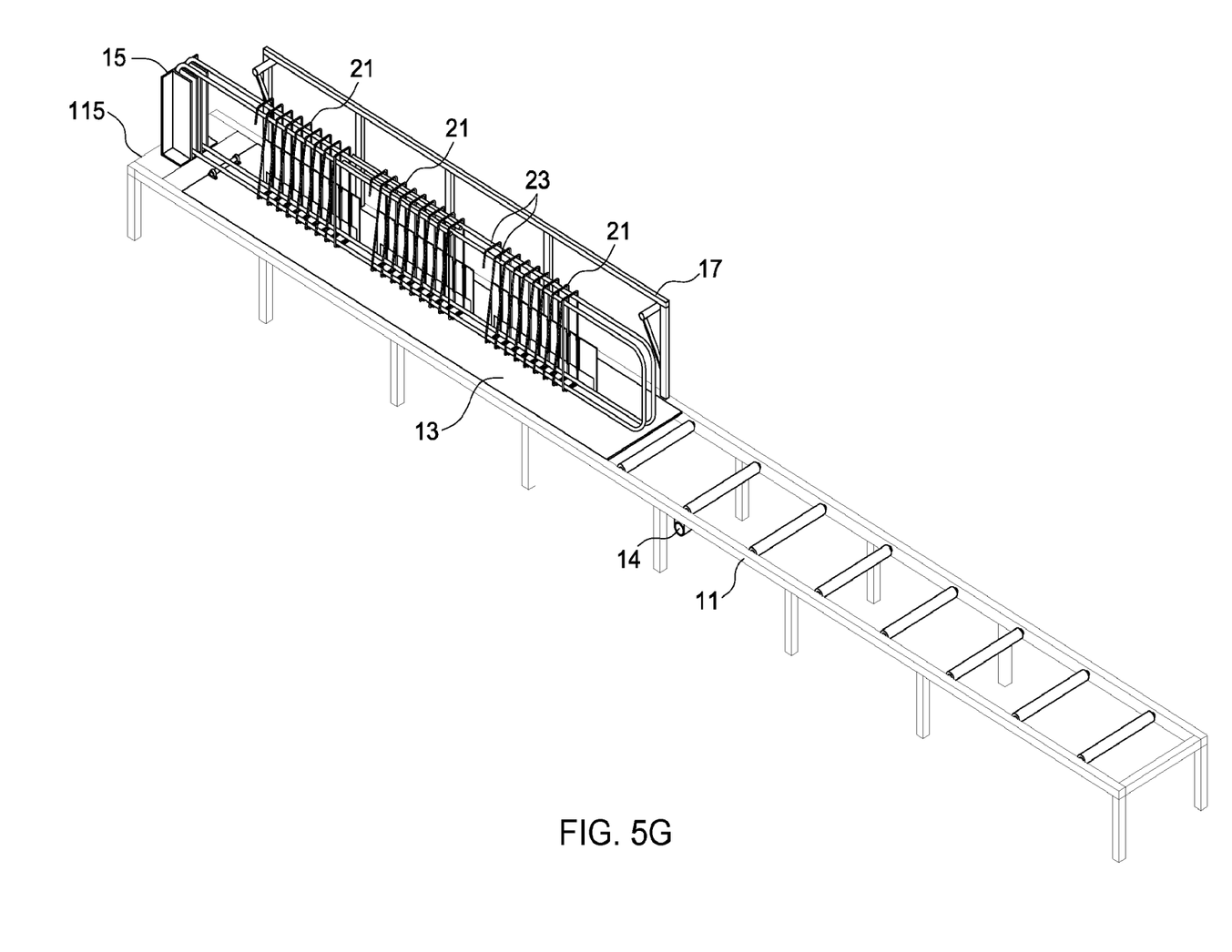
FIG. 5G is a schematic view showing the stirrups are installed onto the main bars in accordance with an embodiment of the instant disclosure.

FIG. 5G shows that one end of the trolley 13 has moved to the first end 115 of the base member 11 and the elongated main bars 23 have been installed into the spiral stirrups 21 on the trolley 13.

Figure 5H:
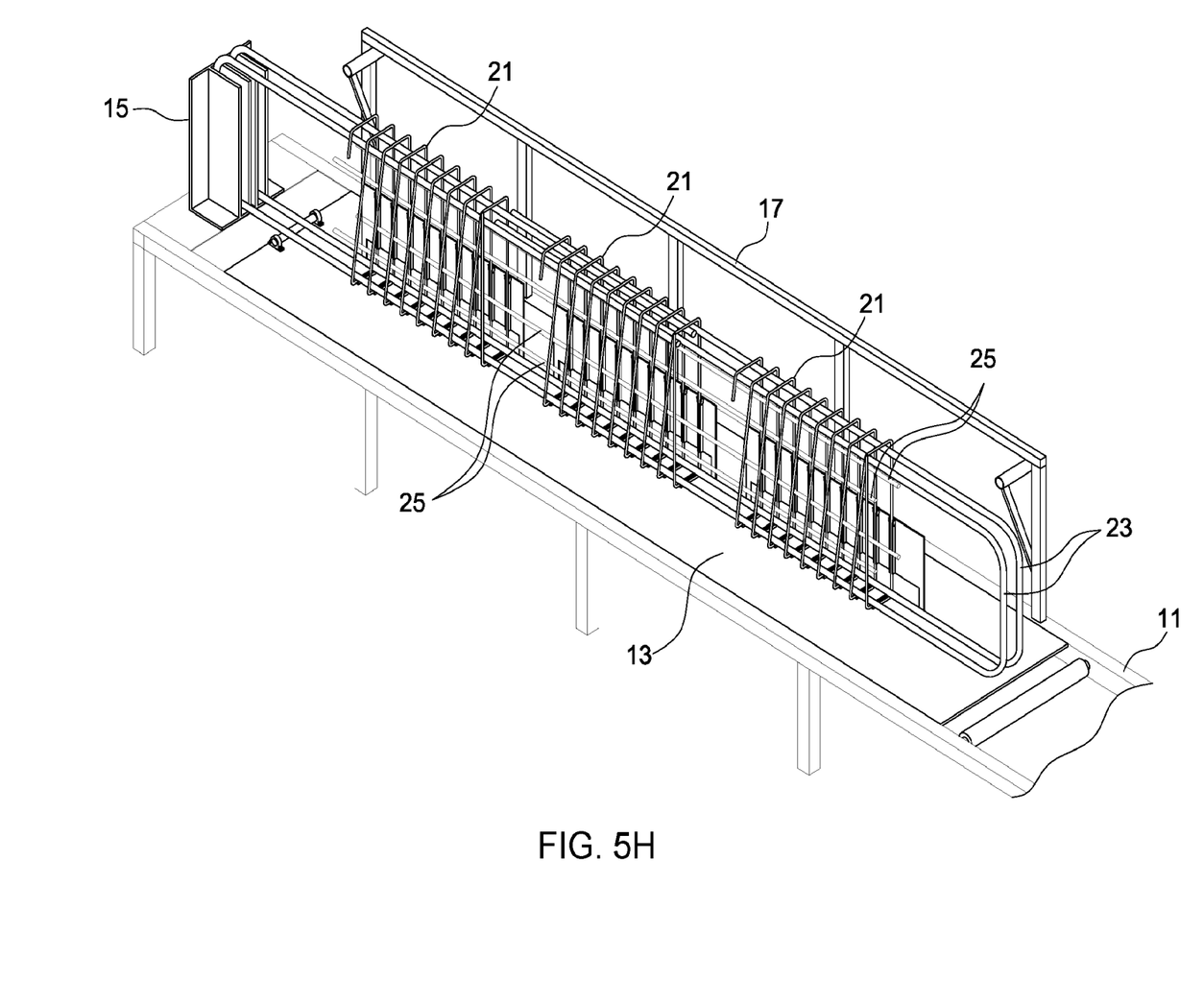
FIG. 5H is a regional view showing the stirrups are installed onto the main bars in accordance with an embodiment of the instant disclosure.

FIG. 5H shows that a plurality of tie bars 25 are installed into the central space 211 of the spiral stirrups 21 along the length of the base member 11. Further, the tie bars 25, the spiral stirrups 21 and the elongated main bars 23 are bound together.

Figure 5I:
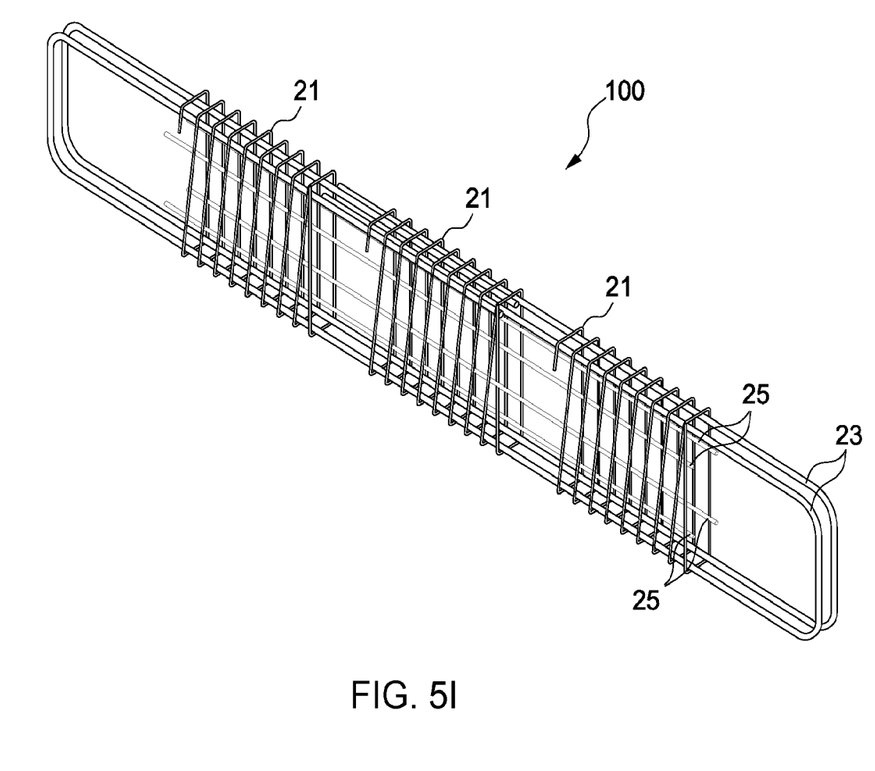
FIG. 5I shows a reinforcement cage manufactured in accordance with an embodiment of the instant disclosure.

The tie bars 25, the spiral stirrups 21 and the elongated main bars 23 which are bound together are removed from the jig 1 so as to form a reinforcement cage 100.

The above embodiments merely describe the principle and effects of the present disclosure, instead of being used to limit the present disclosure. Therefore, persons skilled in the art can make modifications to and variations of the above embodiments without departing from the spirit of the present disclosure. The scope of the present disclosure should be defined by the appended claims.

What is claimed is:

1. A method for making a reinforcement cage, comprising:
   providing a jig, which comprises:
      a base member;
      a plurality of rollers disposed on the base member and spaced at intervals along a lengthwise direction of the base member;
      a trolley for loading stirrups of the reinforcement cage, the trolley being slidably disposed on the rollers;
      a driver for driving the trolley so that the trolley is moveable on and along the lengthwise direction of the base member; and
      a main bar positioning member disposed at a first end of the base member and comprising a plurality of slots, wherein the main bar positioning member is configured to hold an end of a main bar of the reinforcement cage;
   arranging the trolley at a second end of the base member, which is opposite to the first end of the base member;
   providing at least one spiral stirrup on the trolley;
   providing at least one main bar, wherein one end of the at least one main bar is fixed in the plurality of slots of the main bar positioning member such that the at least one main bar extends along the lengthwise direction of the base member; and
   actuating the driver to drive the trolley to move toward the first end of the base member along the lengthwise direction of the base member such that the at least one main bar passes through a central space of the spiral stirrup and thereby the at least one main bar is surrounded by the at least one spiral stirrup disposed on the trolley.

2. The method of claim 1, further comprising: providing at least one auxiliary bar and moving the at least one auxiliary bar through a central space of the spiral stirrup along the lengthwise direction of the base member; and binding together the at least one auxiliary bar, the at least one spiral stirrup and the at least one main bar.

3. The method of claim 1, wherein the trolley comprises a plurality of seats for positioning stirrups, and wherein the seats are arranged on the trolley and spaced at intervals along a lengthwise direction of the trolley, and wherein the step of providing at least one spiral stirrup on the trolley comprises positioning each bottom edge of the at least one spiral stirrup in a groove seat of the plurality of seats.

4. The method of claim 3, wherein the trolley comprises a stirrup support which is arranged on the trolley and extends along a lengthwise direction of the trolley; wherein the stirrup support comprises a plurality of stirrup positioning members arranged to correspond to the seats; and wherein the step of providing at least one spiral stirrup on the trolley comprises positioning each side edge of the at least one spiral stirrup in a slot of the stirrup positioning members.

5. The method of claim 1, wherein the jig further comprises an auxiliary frame arranged on the base member and adjacent to the first end of the base member, and wherein the auxiliary frame comprises at least one removable supporting rod which is substantially disposed above the base member and projects from the auxiliary frame in the manner of a cantilever; wherein the step of providing at least one main bar comprises supporting a bottom edge of the at least one main bar by the at least one supporting rod of the auxiliary frame; and wherein the at least one supporting rod is removed from the auxiliary frame before the trolley is driven to move toward the first end of the base member.

6. The method of claim 1, wherein the trolley comprises an auxiliary roller disposed at one end of the trolley, which is closer to the first end of the base member; and wherein the at least one main bar passes through a central space of the spiral stirrup with the aid of the auxiliary roller when the trolley moves toward the first end of the base member along the lengthwise direction of the base member.

7. The method of claim 1, wherein the jig further comprises a plurality of main bar supports rotatably mounted on the base member through pivoting members, and wherein each of the pivoting members comprises a spring which retains a respective pivoting member of the pivoting members so that a top of the main bar supports extends beyond a height of a bottom plate of the trolley; wherein the step of providing at least main bar comprises supporting a bottom edge of the at least one main bar on the main bar support; and wherein the trolley pushes the main bar supports such that each main bar support rotates around the axis of the respective pivoting member when the trolley moves toward the first end of the base member along the lengthwise direction of the base member, and thereby the at least one main bar passes through the central space of the spiral stirrup.

* * * * *